US006272920B1

(12) United States Patent
Tank et al.

(10) Patent No.: US 6,272,920 B1
(45) Date of Patent: Aug. 14, 2001

(54) DEVICE FOR MEASURING THE MASS OF A FLOWING MEDIUM

(75) Inventors: Dieter Tank, Kornwestheim; Uwe Konzelmann, Asperg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,403

(22) PCT Filed: Jan. 28, 1999

(86) PCT No.: PCT/DE99/00201

§ 371 Date: Dec. 27, 1999

§ 102(e) Date: Dec. 27, 1999

(87) PCT Pub. No.: WO99/53275

PCT Pub. Date: Oct. 21, 1999

(30) Foreign Application Priority Data

Apr. 8, 1998 (DE) .............................................. 198 15 658

(51) Int. Cl.[7] ........................... G01F 1/684; G01M 19/00
(52) U.S. Cl. ...................... 73/204.22; 73/202.5; 73/118.2
(58) Field of Search ........................... 73/204.21, 204.22, 73/202, 202.5, 118.2; 181/224, 233, 226

(56) References Cited

U.S. PATENT DOCUMENTS

| 2,477,436 | * | 7/1949 | Bannister | 181/233 |
| 4,418,578 | * | 12/1983 | Blechinger | 73/861.22 |
| 5,133,647 | * | 7/1992 | Herron et al. | 181/224 |
| 5,546,794 | * | 8/1996 | Kuhn et al. | 73/118.2 |

* cited by examiner

*Primary Examiner*—Harshad Patel
(74) *Attorney, Agent, or Firm*—Ronald E. Greigg; Edwin E. Greigg

(57) ABSTRACT

A device for measuring the mass of a medium flowing in a line, especially the aspirated air mass on an internal combustion engine, comprising a flow tube, which is disposed in the line. A measuring element around which the flowing medium flows is disposed in the flow tube. The medium flows from the line into the flow tube at an inlet opening and out of the flow tube into the line at an outlet opening. An outlet end face of the flow tube surrounding the outlet opening has structural grooves, which extend with a radial directional component with respect to a longitudinal axis of the flow tube.

20 Claims, 2 Drawing Sheets

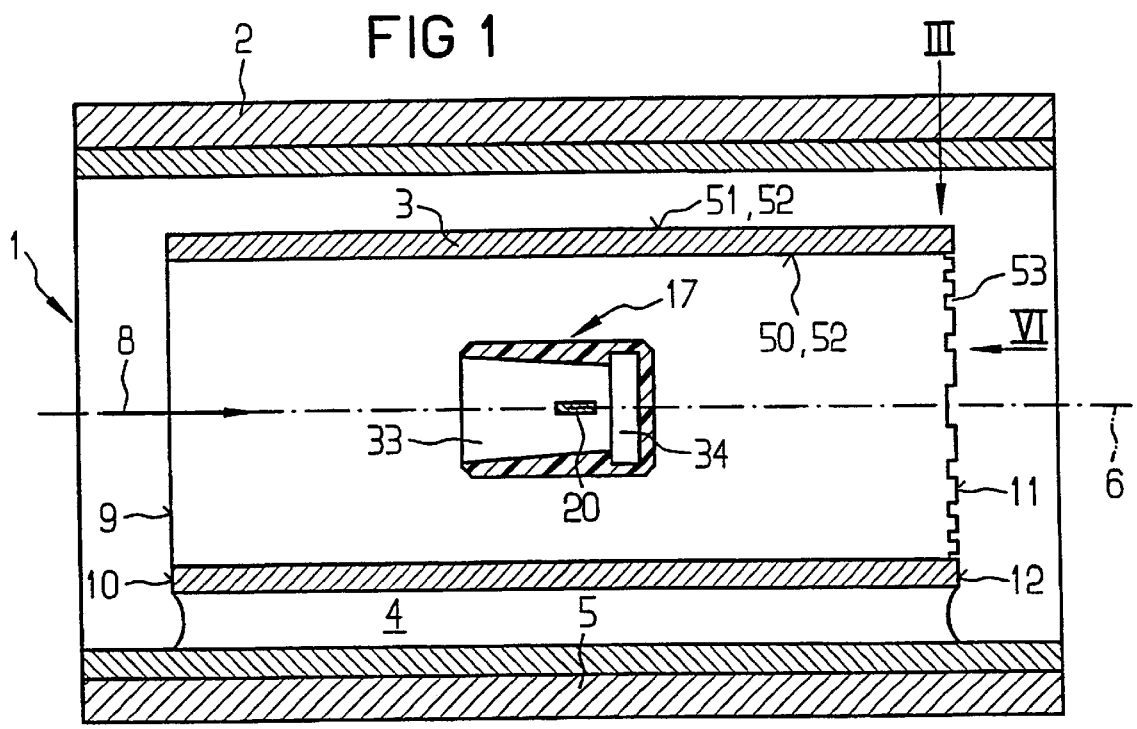
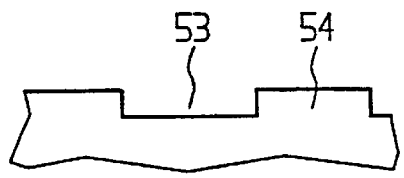
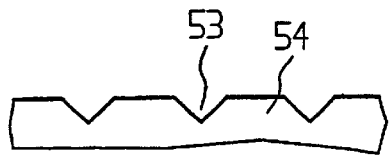
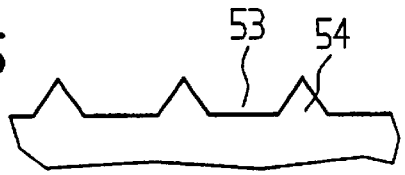

DEVICE FOR MEASURING THE MASS OF A FLOWING MEDIUM

PRIOR ART

The invention is based on a device for measuring the mass of a flowing medium, also called a flow rate meter.

From European Patent Disclosure EP 0 087 621 B1, a device for measuring the mass of a medium flowing in a line, in particular the aspirated air mass of an internal combustion engine is known, in which a measuring element, for instance in the form of a hot wire, is placed in a bypass conduit embodied offset from the main aspiration conduit. The opening and closing of the inlet valves of the various cylinders of the engine cause considerable fluctuation or pulsation in the flow velocity in the bypass conduit, and the intensity of this fluctuation or pulsation depends on the aspiration frequency of the individual pistons, or on the engine rpm. These flow fluctuations adulterate the outcome of measurement, namely the average flow velocity prevailing in the bypass conduit and the aspirated air mass of the engine that can be calculated from the aspirated air, considerably. Depending on the intensity of the pulsation in the flow velocity, the mean flow velocity is demonstrably under-indicated in the partial-load range of the engine, for instance, and overindicated when the throttle valve is fully open. To reduce these measurement errors that occur with pulsating flows, in the device known from EP 0 087 621 B1 certain longitudinal and cross-sectional relationships of the main aspiration conduit and the bypass conduit, which are ascertained by calculation and numerous measurements, are selected, and the location of the measuring element in the bypass conduit is prescribed. On the one hand, this limits the engineering and design possibilities and possibilities for installing device considerably, and on the other, the embodiment of the device requires a large installation space.

In German Patent Disclosure DE 4340 882 A1, to reduce the flow fluctuations, it is proposed that a flow tube in the form of an internal tube be disposed in the line to be measured, such as the aspiration conduit of an internal combustion engine. Once again, the measuring element is disposed in a bypass conduit, which is located approximately in the middle of the flow tube. The flow tube has friction faces on its inside that bring about a flow resistance that is dependent on the intensity of flow pulsation. At a high pulsation intensity, because of the effects of friction occurring in the peripheral region of the flow tube, the flow is therefore positively displaced into the inner region, that is, the region of the bypass conduit having the measuring element, so that an underindication occurring without the flow tube at a high pulsation intensity of the flow is effectively compensated for. The flow tube known from DE 43 40882 A1 has therefore fundamentally proved itself. A disadvantage, however, is that in practical operation a loud, irritating whistling noise occurs.

German Patent DE 44 07 209 C1 can also be referred to, in the sense that from this reference it is known to dispose the measuring element in a measurement conduit that tapers in the flow direction and which is adjoined by an S-shaped deflection conduit. With this arrangement, the independence of the outcome of measurement from the pulsation intensity of the flow can be further improved. In particular, the arrangement is largely invulnerable to a return flow, counter to the main flow direction, that occurs at high pulsation intensities.

ADVANTAGES OF THE INVENTION

The device according to the invention for measuring the mass of a medium flowing in a line, has the advantage that in operation no irritating whistling noises occur, or at least the whistling is noises are markedly reduced. The structural grooves according to the invention on the outlet end face surrounding the outlet opening prevent eddies in the region of the outlet opening of the flow tube from detaching, which would cause loud, irritating noises. It has been found that the structural grooves of the invention on the outlet end face surrounding the outlet opening do not lessen the above-described fluidic advantages of the flow tube that improve the accuracy of measurement.

Advantageous refinements of and improvements to the device defined herein are possible with the provisions recited hereinafter.

It has been demonstrated that by means of structural grooves of rectangular, triangular or trapezoidal cross-sectional profile, an especially effective reduction in irritating noises can be attained. Especially preferably, the structural grooves extend radially to the longitudinal axis of the flow tube and are disposed at equal angular intervals on the outlet end face. As a result, a uniform segmentation of the outlet end face is attained, which is advantageous for suppressing the irritating noises. The inlet end face surrounding the inlet opening of the float tube is preferably unstructured, in order not to increase the flow resistance in the region of the inlet opening.

BRIEF DESCRIPTION OF THE DRAWINGS

Exemplary embodiments of the invention are shown in simplified form in the drawings and described in further detail in the ensuing description. Shown are:

FIG. 1, a side view of a first exemplary embodiment of the device according to the invention, in a sectional view;

FIG. 3, a view of the end region of the flow tube, used in the exemplary embodiment of FIG. 1, in the direction marked III in FIG. 1;

FIG. 4, a view corresponding to FIG. 3 of a second, modified exemplary embodiment;

FIG. 5, a view corresponding to FIG. 3 of a third, modified exemplary embodiment.

DESCRIPTION OF THE EXEMPLARY EMBODIMENTS

Figure 2:
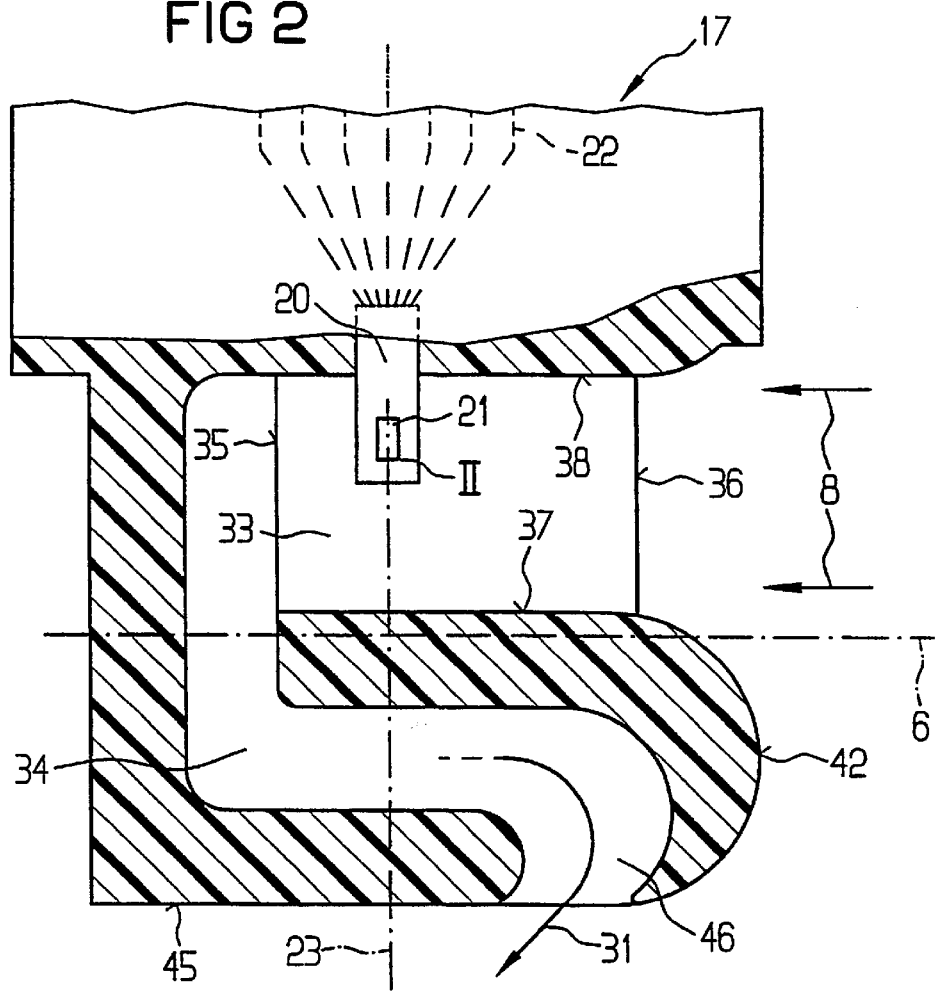
FIG. 2, an enlarged side view, partly in section, of a measurement module used in the exemplary embodiment shown in FIG. 1 of the device of the invention.

The device 1 shown in section in FIG. 1, serves to measure the mass of a medium flowing in a line 2, in particular the aspirated air mass of an internal combustion engine.

The device 1 can be built in as a mountable adapter element, for instance by means of mounting flanges not shown but provided on the ends, into an intake line through which the engine aspirates air from the environment through an air filter, not shown; via a throttle valve neck, not shown, that is provided for controlling the aspirated air mass, the air reaches a combustion chamber of the engine. The device 1 includes a flow tube 3, which is installed approximately centrally in the line 2 and is mounted on the inner wall 5 of the line 2 by means of spacers 4, shown only schematically. A plurality of spacers 4 may be provided, for instant angles of 120° or 900° from one another. In the exemplary embodiment shown, the flow tube 3 is cylindrical and extends about a longitudinal axis 6, which coincides with the longitudinal axis of the line 2. The flow tube 3 has an inlet opening 9, oriented in the main flow direction represented by the arrow 8, and surrounded by an inlet end face 10. Axially opposite the inlet opening is an outlet opening 11, which is surrounded by an outlet end face 12.

Located inside the flow tube 3 is a measurement module 17, to be described in further detail hereinafter, which has a measurement conduit 33 that tapers along the main flow direction 8 toward the outlet 11, for receiving the measuring element 20. The measurement conduit 33 is adjoined by a deflection conduit 34, which as can be seen from FIG. 2 is S-shaped and discharges at a deflection conduit outlet 46 into the flow tube 3. The measuring element 20 is oriented centrally to the measurement conduit 33 and is located in the region of the longitudinal axis 6 of the flow tube 3.

The structure of the measurement module 17 will be described in further detail now with reference to FIG. 2, which shows a sectional side view of the measurement module 17. The measurement module 17 has a slender block-like shape extending in elongated fashion radially in the direction of a longitudinal axis 23 and is introduced, for instance in plug-in fashion, into a recess, not shown, of the flow tube 3. In the preferred exemplary embodiment, shown, the longitudinal axis 23 of the measurement module 17 is oriented at right angles to the longitudinal axis 6 of the flow tube 3. The main flow direction is indicated by the arrows 8 in FIG. 2 as well. The measurement module 17 can be manufactured, for instance of plastic, by injection molding.

The measuring element 20 protrudes centrally into the measurement conduit 33 and is connected to an evaluation circuit, not shown, via electrical connection lines 22. The measuring element 20 is preferably made by so-called micromechanical engineering by etching out a semiconductor body such as a silicon wafer, and it has a configuration that is known for instance from German Patent Disclosure DE 195 24 634 A1. The measuring element 20 has a diaphragm-like sensor region 21, which is created by being etched out and is bounded by the line II in FIG. 2. The sensor region 21 has an extremely slight thickness and has a plurality of resistor layers, also created by etching out, which form at least one temperature-dependent measuring resistor and for instance one heating resistor. It is also possible for the measuring element 20 to be in the form of a so-called hot film sensor element, whose structure can be learned for instance from German Patent Disclosure DE 36 38 138 A1.

The individual resistor layers of the measuring element 20 or sensor region 21 are electrically connected, by means of connection lines 22 extending in the interior of the measurement module 17, to an evaluation circuit, not shown, which for instance includes a bridge-like resistance measuring circuit. The evaluation circuit is accommodated for instance in a carrier part or holder part of the measurement module 17.

As already noted, the measurement module 17 has an axially extending measurement conduit 33 and a deflection conduit 34, which is for instance S-shaped. The measurement conduit 33 extends in the direction of the center axis 6 of the flow tube 3, from an opening 36 of for instance rectangular cross section to an orifice 35. The measurement conduit 33 is defined by an upper face 38, remote from the center axis 6, and a lower face 37 nearer the center axis 11, and two side faces. The plate-like measuring element 20 is oriented in the measurement conduit with its greatest length radially in the direction of the longitudinal axis 23 and is symmetrically divided by the longitudinal axis, so that the medium flows around the measuring element 20 approximately parallel to the center axis 6.

From the inlet opening 36 of the measurement conduit 33, the medium flows to the measuring element 20 and from there into the deflection conduit 34, and then leaves the deflection conduit 34 radially with respect to the longitudinal axis 6, from the deflection conduit outlet 46. Like the deflection conduit 34, the deflection conduit outlet 46 has a rectangular cross section, for instance, and is provided on a lower outer face 45, oriented parallel to the longitudinal axis 6, of the measurement module 17. Counter to the main flow direction 8, a boundary face 42 of the measurement module 17 opposed to the main flow direction 8 adjoins the lower outer face 45; downstream of the inlet 36, this boundary face leads in rounded form from the lower outer face 45 to the lower face 37 of the measurement conduit 33, up to the inlet 36.

The flow tube 3 shown in FIG. 1, together with an inner face 50 and an outer face 51, forms friction faces 52 at which if there is a pulsating flow, eddies induced by incident flow effects, such as at the friction faces 52, or separations occurring from the pressure drop to the inner wall 50 the flow is more or less hindered as it flows along, so that in the region of the inner wall 50 a variable flow resistance exists that is dependent on the pulsation intensity. The flow tube 3 therefore acts as a flow rectifier. As already noted, if a pulsating flow occurs, the measuring element 20 fundamentally tends to cause an underindication if the flow tube 3 is not present. However, because of the flow resistance that is dependent on the pulsation intensity of the flow, the flow tube 3 causes a positive displacement of the flow into the inner region of the flow tube 3, where the measurement module 17 with the measuring element 20 is disposed. Compared to a nonpulsating flow, when there is a strongly pulsating flow in the inner region of the flow tube 3, an increased flow velocity therefore arises, which leads to a compensation of the underindication that would otherwise be present. Without the provision according to the invention, however, the flow tube 3 has the disadvantage that loud whistling noises, which are undesired and irritating, occur during operation. The irritating noises are thought to be due to the fact that at the outlet opening 11 of the flow tube 3, eddies separate at a relatively high repetition frequency, causing the described whistling noise. Embodying the flow tube 3 according to the invention counteracts this irritating whistling noise.

According to the invention, structural grooves 53 are provided on the outlet end face 12 of the flow tube 3 surrounding the outlet opening 11; these grooves extend with a radial directional component with respect to the longitudinal axis 6 of the flow tube 3. Preferably, the outlet opening 11 and the outlet end face 12 surrounding the outlet opening 11 are oriented radially to the longitudinal axis 6 of the flow tube 3. In that case, the structural grooves 53 then preferably extend radially to the longitudinal axis 6 of the flow tube 3.

FIG. 3 shows a radial view of the end region of the flow tube 3 in the vicinity of the outlet opening 11. The direction of the view in FIG. 3 is indicated by the arrow III in FIG. 1. In the exemplary embodiment shown in FIGS. 1 and 3, the structural grooves 53 have a rectangular cross-sectional profile. FIGS. 4 and 5 show alternative exemplary embodiments; FIGS. 4 and 5 again show a radial view of the end region at the outlet opening 11 of the flow tube 3. In the exemplary embodiment of FIG. 4, the structural grooves 53 have a triangular cross-sectional profile. The structural grooves 53 are separated by ribs 54 that have a trapezoidal cross-sectional profile. In the exemplary embodiment shown in FIG. 5, the structural grooves 53 have a trapezoidal cross-sectional profile. Here, the structural grooves 53 are separated by ribs 54 of a triangular cross-sectional profile. It is understood that manifold other embodiments of the structural grooves are conceivable, and in particular structural grooves in the form of part of a circle, trapezoidal structural grooves, or roughening created by unevenly deep and unevenly shaped radially extending structural grooves 53.

By means of the structural grooves 53, any separation of eddies at the outlet end face 12 surrounding the outlet opening 11 is largely averted or at least suppressed. Practical experiments have shown that by the provision of the invention, a significant reduction in incident irritating noise can be achieved. The function of the flow tube 3 as a flow rectifier, with the above-described properties that improve measurement accuracy in the event of highly pulsating flows, is not impaired by the structural grooves 53 of the invention. Particularly when the device 1 is used in motor vehicles for measuring the aspirated air mass of the engine, incident whistling noises are extremely unpleasant and a major detriment to passenger comfort; the provision of the invention thus makes for a considerable improvement.

Figure 6:
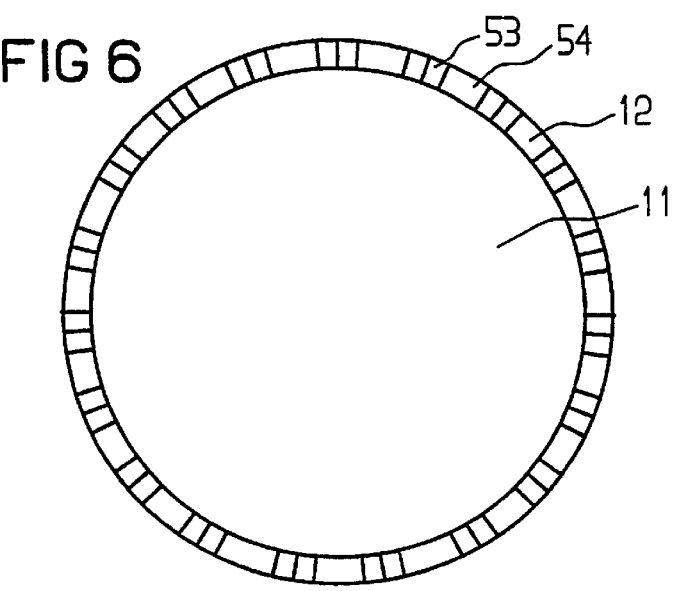
FIG. 6, a view of the flow tube, used in the exemplary embodiment shown in FIG. 1, seen in the direction marked VI in FIG. 1, but in which the structural grooves are embodied as shown in FIG. 4.

For the sake of better understanding of the invention, FIG. 6 shows a front view of the flow tube 3 in the direction marked VI in FIG. 1. For the sake of simplifying the drawing, the measurement module 17 has been left out of FIG. 6. In FIG. 6, the radially extending structural grooves 53, which are separated from one another by the ribs 54, can clearly be seen on the outlet end face 12 surrounding the outlet opening 11 of the flow tube 3. In FIG. 6, the structural grooves 53 are not rectangular, as in the exemplary embodiment shown in FIGS. 1 and 3, but rather are designed with a triangular cross-sectional profile as in the exemplary embodiment shown in FIG. 4.

In accordance with the preferred exemplary embodiment shown in FIG. 6, the structural grooves 53 are disposed at equal angular intervals over the outlet end face 12, so that a uniform segmentation of the outlet end face 12 is attained. The inlet end face 10 surrounding the inlet opening 9 of the flow tube 3 is preferably unstructured; that is, the inlet end face 10 has no structural grooves, so as not to increase the flow resistance. The inlet end face 10 can be embodied in rounded or streamlined form, so as to reduce the flow resistance still further. In principle, it is also possible, however, to provide the structural grooves 53 both on the outlet end face 11 and on the inlet end face 10, which has the advantage that the orientation of the installed flow tube 3 is arbitrary. This can reduce the expense of production. Also, in that case the device 1 is then suited for measuring flows with different main flow directions as well.

The foregoing relates to a preferred exemplary embodiments of the invention, it being understood that other variants and embodiments thereof are possible within the spirit and scope of the invention, the latter being defined by the appended claims.

What is claimed is:

1. A device (1) for measuring the mass of a medium flowing in a line (2), in an aspirated air mass of an internal combustion engine, comprising a flow tube (3), disposed in the line (2), for receiving and supporting a measuring element (20) around which the flowing medium flows, wherein the medium flows from the line (2) into the flow tube (3) at an inlet opening (9) and flows out from the flow tube (3) into the line (2) at an outlet opening (11), in which an outlet end face (12) is provided that surrounds the outlet opening (11) of the flow tube (3) and has structural grooves (53) therein, said structural grooves extend with a radial directional component with respect to a longitudinal axis (6) of the flow tube (3).

2. The device according to claim 1, in which the structural grooves (53) have a rectangular cross-sectional profile.

3. The device according to claim 2, in which the outlet end face (12) is oriented radially to the longitudinal axis (6) of the flow tube (3), and the structural grooves (53) extend radially to the longitudinal axis (6) of the flow tube (3).

4. The device according to claim 2, in which the measuring element (20) is disposed in a measurement conduit (33) that is provided inside the flow tube (3) and tapers in the direction from the inlet opening (9) to the outlet opening (11) of the flow tube (3).

5. The device according to claim 1, in which the structural grooves (53) have a triangular cross-sectional profile.

6. The device according to claim 5, in which the structural grooves (53) of triangular cross-sectional profile are separated by ribs (54) of trapezoidal cross-sectional profile.

7. The device according to claim 6, in which the outlet end face (12) is oriented radially to the longitudinal axis (6) of the flow tube (3), and the structural grooves (53) extend radially to the longitudinal axis (6) of the flow tube (3).

8. The device according to claim 5, in which the outlet end face (12) is oriented radially to the longitudinal axis (6) of the flow tube (3), and the structural grooves (53) extend radially to the longitudinal axis (6) of the flow tube (3).

9. The device according to claim 5, in which the measuring element (20) is disposed in a measurement conduit (33) that is provided inside the flow tube (3) and tapers in the direction from the inlet opening (9) to the outlet opening (11) of the flow tube (3).

10. The device according to claim 1, in which the structural grooves 53 have a trapezoidal cross-sectional profile.

11. The device according to claim 10, in which the structural grooves (53) of trapezoidal cross-sectional profile are separated by ribs (54) of triangular cross-sectional profile.

12. The device according to claim 11, in which the outlet end face (12) is oriented radially to the longitudinal axis (6) of the flow tube (3), and the structural grooves (53) extend radially to the longitudinal axis (6) of the flow tube (3).

13. The device according to claim 11, in which the measuring element (20) is disposed in a measurement conduit (33) that is provided inside the flow tube (3) and tapers in the direction from the inlet opening (9) to the outlet opening (11) of the flow tube (3).

14. The device according to claim 10, in which the outlet end face (12) is oriented radially to the longitudinal axis (6) of the flow tube (3), and the structural grooves (53) extend radially to the longitudinal axis (6) of the flow tube (3).

15. The device according to claim 1, in which the outlet end face (12) is oriented radially to the longitudinal axis (6) of the flow tube (3), and the structural grooves (53) extend radially to the longitudinal axis (6) of the flow tube (3).

16. The device according to claim 15, in which the structural grooves (53) are disposed at equal angular intervals on the outlet end face (12).

17. The device according to claim 15, in which the measuring element (20) is disposed in a measurement conduit (33) that is provided inside the flow tube (3) and tapers in the direction from the inlet opening (9) to the outlet opening (11) of the flow tube (3).

18. The device according to claim 1, in which an inlet end face (10) that surrounds the inlet opening is unstructured.

19. The device according to claim 1, in which the measuring element (20) is disposed in a measurement conduit (33) that is provided inside the flow tube (3) and tapers in the direction from the inlet opening (9) to the outlet opening (11) of the flow tube (3).

20. The device according to claim 19, in which an S-shaped deflection conduit (34), which discharges into the flow tube (3) adjoins the measurement conduit (33).

* * * * *

UNITED STATES PATENT AND TRADEMARK OFFICE
CERTIFICATE OF CORRECTION

PATENT NO. : 6,272,920 B1
DATED : August 14, 2001
INVENTOR(S) : Dieter Tank et al.

It is certified that error appears in the above-identified patent and that said Letters Patent is hereby corrected as shown below:

<u>Title page,</u>
Item [86], should read as follows:

[86] PCT No.: PCT/DE99/00201
    371 Date.: DECEMBER 07, 1999
    102(e) Date: DECEMBER 07, 1999

Signed and Sealed this

Fifteenth Day of January, 2002

Attest:

Attesting Officer

JAMES E. ROGAN
*Director of the United States Patent and Trademark Office*